United States Patent [19]
Kato

[11] 3,827,260
[45] Aug. 6, 1974

[54] SHAFT-COUPLING DEVICE PREVENTABLE FROM OVER-TORQUE TRANSMISSION

[76] Inventor: Taizo Kato, 177-3 Minatoyamocho, Hyogoku, Kobe, Japan

[22] Filed: Sept. 25, 1972

[21] Appl. No.: 291,600

[30] Foreign Application Priority Data
  Sept. 25, 1971  Japan............................ 46-87493
  Sept. 25, 1971  Japan............................ 46-87494
  Mar. 22, 1972  Japan............................ 47-28846
  Feb. 16, 1972  Japan............................ 47-19287

[52] U.S. Cl. ............................................. 64/29
[51] Int. Cl. ............................................. F16d 7/04
[58] Field of Search ................................. 64/29

[56] References Cited
UNITED STATES PATENTS
| | | | |
|---|---|---|---|
| 2,429,091 | 10/1947 | Dodge et al. | 64/29 X |
| 2,475,518 | 7/1949 | Ristow | 64/29 |
| 2,493,232 | 1/1950 | Dodge | 64/29 X |
| 3,552,147 | 1/1971 | Johansson et al. | 64/29 |
| 3,693,381 | 9/1972 | McGee | 64/29 |
| 3,727,432 | 4/1973 | Eaves | 64/29 |

FOREIGN PATENTS OR APPLICATIONS
| | | | |
|---|---|---|---|
| 45,386 | 2/1962 | Poland | 64/29 |

*Primary Examiner*—Allan D. Hermann
*Attorney, Agent, or Firm*—Armstrong, Nikaido & Wegner

[57] ABSTRACT

A mechanical shaft-coupling device fitted with at least one steel ball, inserted at the coupling part of driving and driven shafts, engages with both the driving and driven shafts under normal load to transmit normal torque but, shifts its position to cut the transmission with the driven shaft in over-loaded condition so that the driving shaft idles and no over-torque works on the driven shaft.

2 Claims, 14 Drawing Figures

SHAFT-COUPLING DEVICE PREVENTABLE FROM OVER-TORQUE TRANSMISSION

BACKGROUND OF DISCLOSURE

The present invention relates to a mechanical shaft-coupling device for coupling a driving shaft connected to a motor with a driven shaft connected to its load.

It has been observed that, in mechanical manipulation by use of rotating tools, over-load in the manipulation leads to over-torque in such tools, which become disfigured and unusable or else broken and scattered, thereby menacing operational safety.

With a view to preventing such a dangerous accident, it is desirable to hold the rotating tool not by the driving shaft directly but by the driven shaft coupled with the driving shaft by a shaft-coupling device, which transmits normal torque under normal load but stops its torque transmission as soon as the revolving tool becomes overloaded, and furthermore it is desirable to make the shaft-coupling device resume its normal function as soon as the revolving tool comes back to the normal load condition.

The desirable shaft-coupling devices of the prior art, such as fluid couplings or electro-magnetic couplings, have apparent disadvantageous points such as their complicated mechanism, troublesome handling and expensiveness. Because of this fact, a shaft-coupling device with comparatively simple mechanism has been long needed.

As a means of satisfying the above conditions, there has been used a mechanical shaft coupling device of the resiliently-supported gear clutch type, comprising a clutch disc equipped with partially concave radial fosses reaching the circumference of the disc and having side walls inclined circumferentially and opened toward the other clutch disc being equipped with corresponding partial projections to engage the fosses, and the projections being supported resiliently by plate springs.

Under a normal load applied to the driven shaft, the projections are pressed by the spring plates so that the projections engage with the fosses for normal torque transmission, while if the driven shaft reaches to take an overloaded condition, the axial component force of the torque applied to the inclined sides of the fosses and projections prevails over the spring plate's resilient force, whereby the coupled fosses and projections disengage to cut the torque transmission.

However, this mechanical shaft-coupling device of the prior art, when the driven shaft is under overload, makes the driven shaft turn in an idlingly fashion, thus rubbing the clutch disc with considerable pressure equivalent to the repelling power of the spring plate compressed through disengagement of the coupling device, with the result that the tips of the projections and the inclined side walls of the fosses sustain rapid frictional wear. This wear, therefore, rapidly changes the shape of inclined contact surface of the projections and fosses, with the inclined angle becoming less and the torque limit for disengaging the coupling dropping in a short time. The initially-prescribed torque limit can not be maintained as it is, and it also becomes entirely impossible even to transmit the normal torque.

SUMMARY OF THE INVENTION

A purpose of the present invention is to overcome all the aforementioned disadvantages common to shaft-coupling devices of the prior art by providing a novel and improved mechanical shaft-coupling device coupling the driving shaft with the driven shaft.

This shaft-coupling device of the present invention has a driving shaft wherein a cylindrical pipe end embraces the co-axial cylinder end of a driven shaft with a radial cylindrical slit between the two shafts, several steel balls inserted and seated across said slit, and two wedge rings, having a symmetrical inclined side wall each adopted to come in contact with the balls, thus holding the balls radially and at the same time being pressed in the axial direction by the resilient force of the coil spring. Now, when the driven shaft, under normal load, is within the prescribed torque limit, the coil spring is found resiliently pressing the adjacent wedge rings, which hold the steel ball by the ring's inclined side walls, the balls being engaged both with the driving and driven shafts. Thereby transmitting the torque of the driving shaft to the driven shaft.

Then, when the driven shaft comes under overload beyond the prescribed load limit, the overload torque of the driven shaft causes the inclined side walls of the wedge rings to be forcibly pressed by the steel ball, wherein said steel ball shifts its position radially and is plunged with force in-between the rings to disengage itself from the former coupling position to another position received only by either one of the shafts under resilient pressure of the spring. This shifting of the steel ball cuts the transmission of revolving torque of the driving shaft, making the driven shaft idle, thereby eliminating a danger of overload torque being transmitted to the driven shaft and preventing revolving tools from being bent or broken into pieces.

Further, when the cause of overload is removed from the then over-loaded driven shaft and a normal load condition is restored, the decrease in the driven shaft's load torque also decreases the contacting pressure of the steel balls against the inclined side walls of the wedge rings, whereby said wedge rings are pressed by the coil spring to push the steel ball back to its normal position and hold it thereat, the ball thus being engaged with both the driving and driven shafts. Accordingly this change causes the steel ball to transmit the normal revolving torque from the driving shaft over to the driven shaft. In this way, the shaft-coupling device in accordance with the present invention is designed to transmit only the normal torque below the prescribed torque limit and cuts the transmission while the driven shaft is under overload as a safety device to protect the revolving tool connected thereto.

Furthermore, the device according to the present invention is designed so as to make the steel ball, under the driven shaft's overload, rotatably move radially as it presses itself, with the reactionary pressure to the resilient sustaining strength of the spring given to the ball through the wedge ring, against the driven shaft without slidably moving along the relative osculating surface of the driven shaft. The ball can only roll on said osculating surface with no unnecessary contacting pressure, thereby minimizing its wear. Similarly, the ball, presently contacting the inclined side-wall of the wedge ring, does not slidably move on said side-wall in contact but merely rolls, barely being subjected to frictional wear. Therefore, this device can be used due to its sturdy nature explained above for a period much longer than that of the conventional type which is subjected to extreme wear because of its sliding friction under pressure, and it also assures, by its special character, the steady maintenance of its ability without failure in its function in relation to the initially prescribed torque limit, adding to the reliability of the device. Further, the device according to the present invention can minutely adjust, by an adjusting screw, the length of the coil spring which resiliently support the steel ball through the wedge ring, being capable of delicately changing the condition for resiliently holding the steel ball in ballance very easily and of adjusting, in the same delicate way, the prescribed torque valve which functions as a means of safety.

Also, the steel ball is resiliently held in a position in contact with the inclined side-walls of the wedge rings, said side-walls amplifying the coil spring's resilient force. Therefore it is possible to utilize coil springs and others with particular special resiliency features for the present device without resorting to the powerful plate springs of the prior art which directly work on the coupling mechanism. It is also possible to adjust extensively the prescribed torque value as a safety device merely by simply replacing the wedge rings having side walls of various inclined degrees in order to greatly change the aforementioned balance in holding the steel ball.

Also, with this shaft-coupling device, having a radial slit between the matched sides of the driving shaft pipe end and the driven shaft end where the steel ball works intermediately, said slit, if the size thereof is changed, can change the intermediate condition of the steel ball inserted in-between, thereby obtaining extensive changes in the efficiency in torque transmission. Therefore, by replacing the driven shaft with another having a different diameter, the prescribed safety torque value may be greatly changed.

BRIEF DESCRIPTION OF THE DRAWINGS

Other objects, features and advantages of the present invention will become apparent from a study of the following description of preferred embodiments with the accompanying drawings, in which.

DETAILED DESCRIPTION

Referring now to the drawings, the present invention is further illustrated by the following examples. Of course, this invention shall not be limited to the following examples.

EMAMPLE 1

As shown in FIGS. 1 to 7, a driving shaft 1 has an appropriate given number of concave recesses on the inner cylindrical wall of its pipe end, and a driven shaft end having penetrating holes thereon at the positions corresponding to said recesses of the driving shaft pipe end is slidably fitted to the follow of said driving shaft pipe end. A bolt 6 placed within the driven shaft end hollow has its head 6' equipped with a side wall 5 inclined towards the driving shaft, and is fitted with a movable wedge ring 9 having an inclined side wall 8 adjacent to the inclined side wall 5. Said wedge ring 9 is mounted in-between the bolt head 6' and a bottom nut 7 engaging the screw-threaded end of the bolt 6 and is pressed against the bolt head 6' by a coil spring 10. A washer may also be inserted between the nut 7 and the spring. The ball 11, of a diameter bigger than the thickness of the driven shaft cylindrical pipe, is fitted to the recess 2 without engagement and comes into contact with the inclined side walls 5 and 8 at the part of the ball protruding into the cylindrical end of the driven shaft.

As the coil spring's force constantly presses the wedge ring 9 and the bolt head 6' against each other with pressure E, the steel ball 11 under the pressure E in turn presses the inner cylindrical wall of the driving shaft 1 with outgoing force F. This force F, determined by the pressure E and the inclined angle of the side walls 5 and 8, can be adjusted by changing the matched relative position of the bolt 6 and the nut 7 or by changing the angle of the inclined side walls 5 and 8. The former adjustment can be made before the shaft-coupling device body is assembled, while the latter method is possible by replacing the presently used bolt 6 and wedge ring 9 with any one of the other several set with different angles on the inclined side walls 5 and 8. The above adjustment may be easily made as occasions demand either extensively or delicately.

Figure 1:
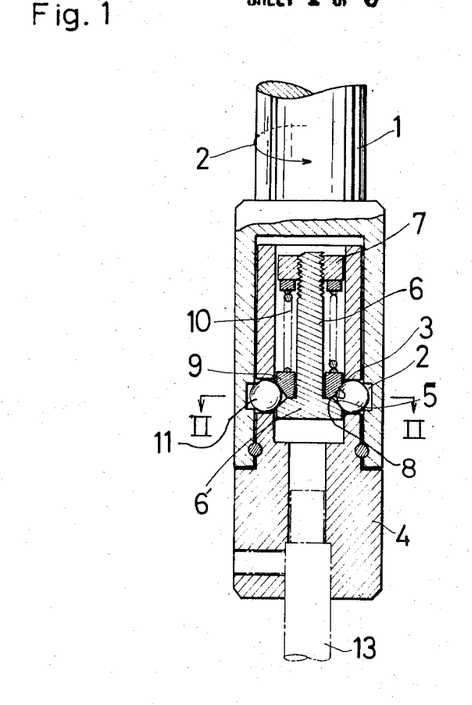
FIG. 1 is a longitudinal cross-sectional side view of a shaft-coupling device in normal loaded condition according to a preferred embodiment.
Figure 2:
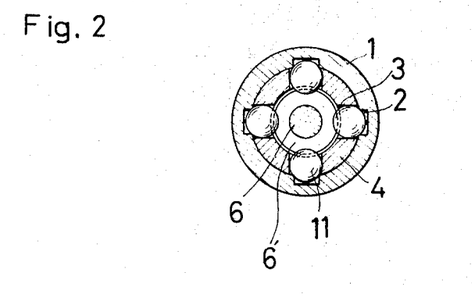
FIG. 2 is a transverse cross-sectional plane view at the line II-II in the FIG. 1.
Figure 3:
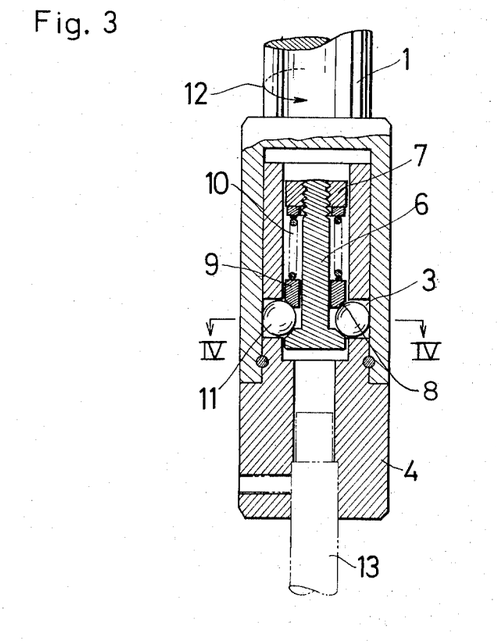
FIG. 3 is a longitudinal cross-sectional side view of the same shaft-coupling device in over-loaded condition.
Figure 4:
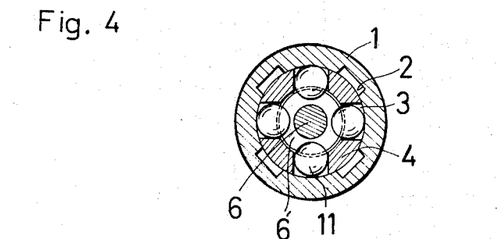
FIG. 4 is a transverse cross-sectional plane view at the line IV—IV in the FIG. 3.
Figure 5:
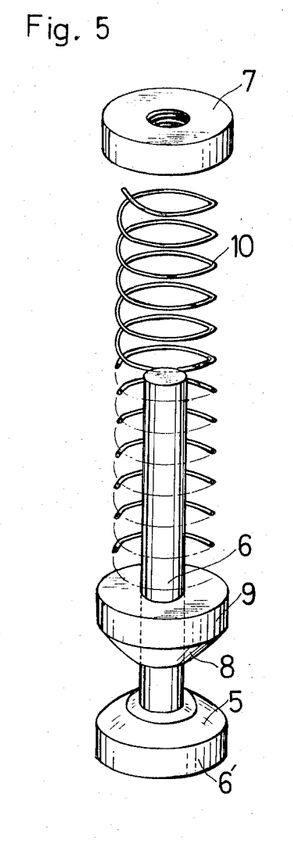
FIG. 5 is a perspective view showing segmental parts, including the wedge rings and the coil spring, of the same shaft-coupling device.
Figure 6:
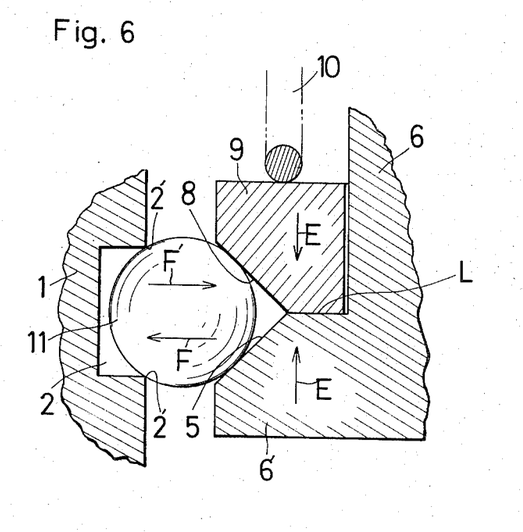
FIG. 6 is a fractional enlarged cross-sectional side view showing the steel ball setting in the same shaft-coupling device.

As described above, the steel ball 11, constantly presses the driving shaft 1 with the prescribed force F, thereby protruding from the penetrating hole 3 into the recess 2 with force F when, as shown in FIGS. 1 and 2, the recess 2 and the penetrating hole 3 are positioned correspondingly. As illustrated in FIG. 6, the wedge ring 9 and the bolt head 6' can be designed to come into contact at F line L when the steel ball 11 engages the recess 2, whereby the pressing point 2' of the steel ball 11 against the recess 2 or the pressing part of the steel ball against the inclined side walls 5 and 8 does not receive any more force than is really needed, thereby lessening frictional ware at the places mentioned.

The driving shaft 1, in this state, being turned 12 axially, has its torque transmitted to the driven shaft 4 through the recess 2, steel ball 11 and the penetrating hole, whereby the cutting tool 13 connected to the driven shaft can do the required cutting work. In case the tool meets any resistance beyond the prescribed value in due course of manipulation, the force of the driven shaft 4 to stop its revolution runs against that of the driving shaft 1 to continue its revolution, whereby the steel ball 11 is given inward force F' which, if stronger than the outward force F, pushes the steel ball 11 to forcibly find its way inbetween the wedge ring 9 and the bolt head 6' and to subsequently plunge into the penetrating hole 3, disengaging itself from the driving shaft 1. The steel ball 11, thus being unable to act as intermediary between the driving and driven shaft, the driven shaft comes to a stop discontinues its revolution. The driving shaft still continues its revolution, making the steel ball 11 revolve in contact with inclined walls 5 and 8 due to its friction by a spot-contact with the inner cylindrical wall of the pipe end of the driving shaft 1. This revolving steel ball 11 in turn causes the bolt 6 and wedge ring 9, all free to turn axially and made to press the steel ball 11 by their inclined side walls, to revolve co-axially, whereby the contact point between the steel ball 11 and the inclined side walls 5 and 8 constantly changes. The contact portions of the ball, the walls and the shaft will therefore wear down uniformly, resulting in the great durability of the parts.

Figure 7:
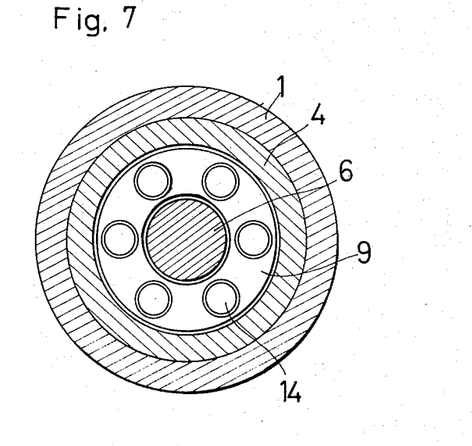
FIG. 7 is a transverse cross-sectional plane view showing another arrangement of the coil springs in the same shaft-coupling device.

This way, when the cutting tool 13 meets the resistance prescribed in accordance with the pre-adjusted force F, the driven shaft automatically stops and serves the purpose of safety. With said resistance removed, the steel ball 11, when the recess 2 and the penetrating hole 3 come to the corresponding positions, again juts into the recess 2, whereby the driven shaft 4 can start revolving in unison with the driving shaft 1. The above-mentioned function and effect, even when the driven shaft's 4 relationship with the driving shaft 1 is reversed, stay exactly the same. FIG. 7 shows a plural number of springs 14 in place of the spring 10, the function and effect thereof being similar. As explained above, the wedge ring 9 and the bolt head 6' are used for pressing, at their inclined side walls, the steel ball 11, whereby the inclined angle of the side wall, if changed, is capable of delicately adjusting the force F in a wide range. Furthermore, said wedge ring 9 and the bolt head 6' are entirely free from both the driving and driven shafts 1 and 4, and as shown in FIGS. 1 and 6, the steel ball 11 is not given any more pressure than is necessary, with resultant characteristic of minimum wear of said ball 11 and other parts of the device which come into contact therewith, and longer durability of the cutting tool is also assured.

EXAMPLE 2

Figure 8:
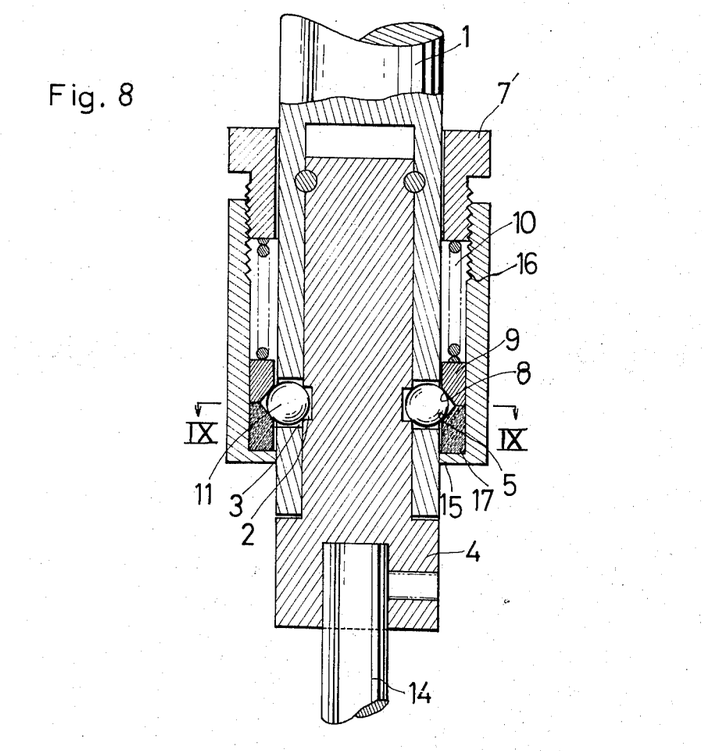
FIG. 8 is a longitudinal cross-sectional side view of another shaft-coupling device, in normal loaded condition, according to another preferred embodiment.
Figure 9:
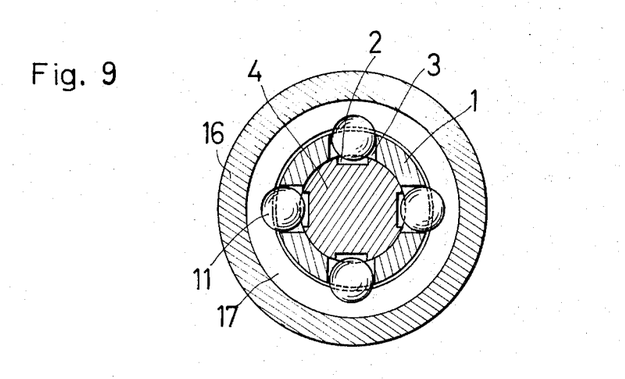
FIG. 9 is a transverse cross-sectional plane view at the line IX—IX in the FIG. 8.
Figure 10:
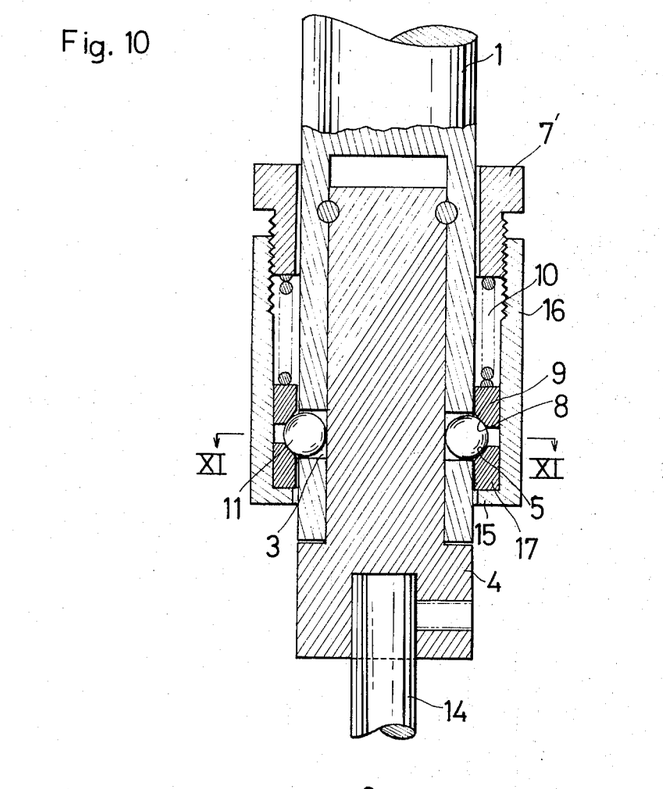
FIG. 10 is a lougitudinal cross-sectional side view of the same shaft-coupling device as the FIG. 8, in overloaded condition.
Figure 11:
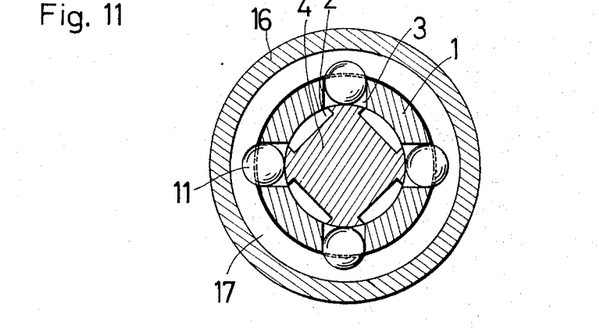
FIG. 11 is a transverse cross-sectional plane view at the line XI—XI in the FIG. 10.

As shown in FIGS. 8 and 11, the driving shaft 1 has a given number of holes 3 bored on the cylindrical pipe end wall of said driving shaft 1, and the driven shaft 4, equipped with recesses 2 made at the positions corresponding to those of the holes 3, is fitted into the cylindrical hollow of the end pipe of driving shaft 1 so that the driven shaft end 4 can revolve co-axially. A torque-adjusting cylinder 16, having a radial bottom end 15 is fitted in an idling fashion to the outer circumference of the driving shaft 1 and houses a pair of wedge rings 9 and 17, the former having a bottom side wall 8 and the latter a top side wall 5 both inclined toward the driving shaft 1 and in contact with each other in symmetrical positions permitting them to idle or shift their positions axially. The adjusting cylinder 16 further has a nut 7' threaded thereinto at its top for adjusting the torque limit and a coil spring 10 inserted in-between the nut 7' and the wedge ring 9. Each hole 3 is made to house, neutrally, a steel ball 11 larger in diameter than the thickness of the cylindrical pipe wall of the driving shaft land engaging in part the inclined side walls 5 and 8.

Accordingly, the wedge rings 17 and 9 receive from by the coil spring 10 the pressure toward each other, the pressure pressing the steel ball by way of the inclined side walls 5 and 8 toward the driven shaft 4. The resilient force of the coil spring 10 is adjustable through screwing the nut 7' into or back from the adjusting cylinder 16. Also the pressing force of the steel ball 11 against the driven shaft 4 can be readily changed by means of adjusting the resilient force of the coil spring 10 or providing other wedge rings of a different inclining degree at their side walls.

The steel ball 11, as above-described, constantly presses the driven shaft 4 with pre-adjusted pressure, engages with the recess 2 when said recess 2 is in a position corresponding to that of the hole 3, wherein the torque of the driving shaft 1 is transmitted, through the hole 3, steel ball 11 and recess 2, to the driven shaft 4 for cutting work.

When the cutting tool 13 meets resistance greater than this torque, the driven shaft 4 is given a force to stop its revolution, when the driving shaft 1 continues its revolution, whereby the steel ball 11 is given force to push its way off the recess 2. If this force is stronger than the resilient force of the coil spring 10, it compresses the spring coil 10 and pushes open the wedge rings 17 and 9, whereby the steel ball 11 is made to retreat into the hole 3, the connection between the driving shaft 1 and the driven shaft 4 being cut to stop the latter's revolution.

When the above-noted resistance met by the cutting tool 13 is removed, the steel ball 11 juts out from the hole 3 to the recess 2 as soon as the hole 3 and the recess 2 come to their corresponding positions, the ball thereby being positioned as shown in FIGS. 10 and 11 to turn the driving shaft 1 and the driven shaft 4 co-axially.

EXAMPLE 3

Figure 12:
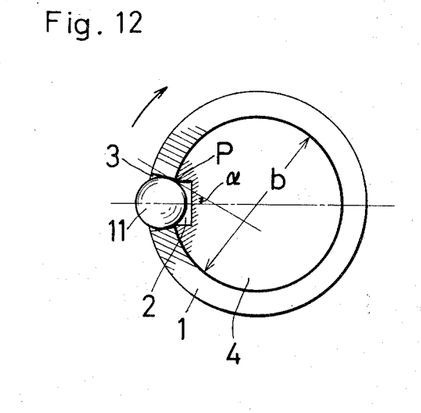
FIG. 12 is a transverse cross-sectional plane view corresponding to the FIG. 9 with a small size radial slit between the driving shaft and the driven shaft.
Figure 14:
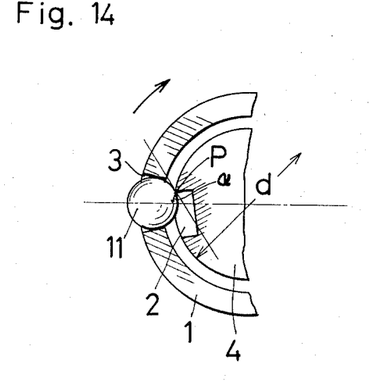
FIG. 14 is a transverse cross-sectional plane view corresponding to the FIG. 9 with a large size radial slit between the driving shaft and the driven shaft.

In accordance with example 2 described above, 3 driven shafts 4, 4' and 4'', having different outer diameter $b$, $c$ and $d$ at a part of the shaft (including the part corresponding to the hole 3) to be inserted into the cylindrical hollow end of the driving shaft 1, are fitted with the recess 2, corresponding to the hole 3 as indicated in FIGS. 12 and 14 related respectively to FIGS. 8 and 9. Another alternative may be to use splayed shaft to act in place of the recess. As shown in FIGS. 8 and 9, the driven shaft 4 is inserted into the hollow end of the driving shaft 1 and secured so as not to come off therefrom. In this state, the steel ball 11 is found projecting into the recess as shown in FIGS. 8 and 9 due to the pressing force of the coil spring 10.

Figure 13:
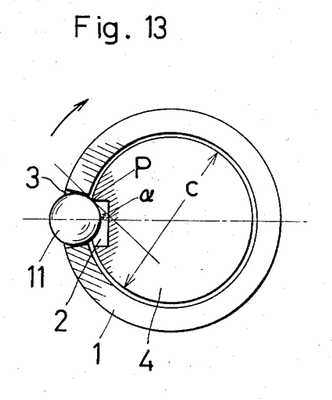
FIG. 13 is a transverse cross-sectional plane view corresponding to the FIG. 9 with a medium size radial slit between the driving shaft and the driven shaft.

Now, when the driving shaft 1 is revolved in the arrowed direction as shown in FIGS. 12, 13 and 14, the torque is transmitted to the driven shaft through the steel ball 11 and the point P of the driven shaft 4 presently in contact with the steel ball 11. The driven shafts 4, 4' and 4'' with respective different outer diameter $b$, $c$ and $d$, when inserted into the cylindrical pipe end of the driving shaft 1, show changes in the angle $(a)$ formed by the tangent line at the point P and the shaft's center line passing through the center of the steel ball 11 as shown in FIGS. 12, 13 and 14. This angle $(a)$ changes greatly in a geometrical progression because of the spherical shape of the steel ball 11, wherein the lesser angle the greater the torque which can be transmitted.

With a good number of driven shafts as herein described having different diameter, it is possible to easily adjust the torque in a wide range through relacing one with another as necessity demands.

While a few embodiments of the present invention have been illustrated and described in detail, it is readily apparent to those who are skilled in the art that modifications and alterations thereof can be made without deviating from the principles of the present invention set forth in the following claims.

I claim:

1. A shaft-coupling device preventable from over-torque transmission, comprising;

a driving shaft having a co-axial cylindrical pipe end, a driven shaft having a co-axial cylinder end with a smaller out-side diameter than the inner side diameter of said driving shaft pipe end, said driven shaft cylinder end being inserted and coupled rotatably to said driving shaft pipe end, a wedge ring having an inclined side wall, a bolt having a head of greater diameter and with its circumferential wall inclined, at least one steel ball inserted between said driving shaft pipe end and driven shaft cylinder end and being urged radially outwardly by the wedge ring and bolt head, with said wedge ring being urged toward the ball by a spring placed between the wedge ring and a nut engaging a screw-threaded end of the bolt, wherein said wedge ring and said bolt are supported rotatably in contact with the balls inside said cylinder end, whereby, in a state of normal-torque transmission, said steel ball is so positioned as to engage both said driving shaft pipe end and said driven shaft cylinder end, such that while said driven shaft is over-loaded, said steel ball is forced to push said wedge ring apart from the inclined wall of the bolt and having another position such as to engage either one of said driving shaft pipe end or said driven shaft cylinder end.

2. A shaft-coupling device preventable from over-torque transmission as claimed in claim 1, wherein:

said driven shaft cylinder end having a radial penetrating hole in which said steel ball is movable along to shift is position:

said driving shaft pipe end having a concaved recess in which said steel ball is received to engage, and said wedge ring and said bolt head being set in an inner part of said driven shaft cylinder end so as to be circumscribed on said steel ball.

* * * * *

UNITED STATES PATENT OFFICE
CERTIFICATE OF CORRECTION

Patent No. 3,827,260        Dated August 6, 1974

Inventor(s) TAIZO KATO

It is certified that error appears in the above-identified patent and that said Letters Patent are hereby corrected as shown below:

Column 3, lines 12-13, change "prescribed torque valve which functions" to -- torque valve so that the device can function --.

Column 4, last line, delete "F";
line 28, change "follow" to -- hollow --.

Column 5, line 5, change "ware" to -- wear --.

Column 6, line 17, change "land" to -- 1 and --.

Column 7, line 21, change "through relacing" to -- by replacing--

Column 8, line 22, before " to engage" insert -- not --.

Signed and sealed this 3rd day of December 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,827,260    Dated March 19, 1976

Inventor(s) TAIZO KATO

It is certified that error appears in the above-identified patent and that said Letters Patent are hereby corrected as shown below:

Column 8, line 22, before "to engage" delete "not".

Signed and Sealed this eighteenth Day of May 1976

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,827,260     Dated January 25, 1977

Inventor(s) Taizo Kato

It is certified that error appears in the above-identified patent and that said Letters Patent are hereby corrected as shown below:

Please correct the above-identified application as follows:

Column 3, line 12, change "valve" to -- value --.

Column 6, line 58, delete ",4' and 4"".

Column 7, line 9, delete ", 4' and 4"".

Column 5, line 65, change "8 and 11" to -- 8 to 11 --.

Figure 1, change arrow "2" to -- 12 --.

Signed and Sealed this

Fifth Day of April 1977

[SEAL]

Attest:

RUTH C. MASON  
*Attesting Officer*

C. MARSHALL DANN  
*Commissioner of Patents and Trademarks*